United States Patent
Marquardt et al.

(10) Patent No.: US 10,419,545 B2
(45) Date of Patent: Sep. 17, 2019

(54) PROFILED WIRELESS DOCKING SYSTEM

(71) Applicant: Dell Products L.P., Round Rock, TX (US)

(72) Inventors: Joseph Paul Marquardt, Menlo Park, CA (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 15/296,707

(22) Filed: Oct. 18, 2016

(65) Prior Publication Data

US 2018/0109627 A1 Apr. 19, 2018

(51) Int. Cl.
*H04L 29/08* (2006.01)
*H04L 12/26* (2006.01)
*H04L 12/24* (2006.01)

(52) U.S. Cl.
CPC ............ *H04L 67/141* (2013.01); *H04L 41/22* (2013.01); *H04L 43/08* (2013.01); *H04L 67/10* (2013.01); *H04L 67/303* (2013.01); *H04L 67/104* (2013.01)

(58) Field of Classification Search
CPC ....... H04L 67/141; H04L 67/10; H04L 41/22; H04L 43/08; H04L 67/303; H04L 67/104; G06F 3/0481
USPC ........................................................ 709/227
See application file for complete search history.

(56) References Cited

U.S. PATENT DOCUMENTS

| | | | | |
|---|---|---|---|---|
| 9,749,038 | B2 * | 8/2017 | Huang | H04M 1/723 |
| 9,883,544 | B1 * | 1/2018 | Marquardt | H04W 40/244 |
| 2006/0233191 | A1 * | 10/2006 | Pirzada | H04N 21/4126 370/463 |
| 2010/0250816 | A1 * | 9/2010 | Collopy | G06F 1/1616 710/303 |
| 2011/0106954 | A1 * | 5/2011 | Chatterjee | G06F 1/1632 709/227 |
| 2012/0096207 | A1 * | 4/2012 | Chen | G06F 13/122 710/303 |
| 2012/0206372 | A1 * | 8/2012 | Mundt | G06F 3/1454 345/173 |
| 2012/0233549 | A1 * | 9/2012 | Ricci | H04M 1/72519 715/740 |
| 2012/0303476 | A1 * | 11/2012 | Krzyzanowski | G06F 8/60 705/26.5 |
| 2013/0162515 | A1 * | 6/2013 | Prociw | G06F 1/1616 345/156 |
| 2014/0351479 | A1 * | 11/2014 | Lee | H04W 76/14 710/303 |

(Continued)

Primary Examiner — James E Springer
(74) Attorney, Agent, or Firm — Haynes and Boone, LLP

(57) ABSTRACT

A profiled wireless docking system, includes a source device that includes a source device screen, a display device, and a sink device that is coupled to the display device. The sink device establishes a wireless docking session with the source device. The sink device then retrieves, from the source device, source device information about the source device. The sink device then retrieves, from the source device, content information that is provided for display on the source device screen by the source device. The sink device determines a source device wireless docking profile based on the source device information and the content information. The sink device then provides the content information for display on the display device according to the source device wireless docking profile.

20 Claims, 8 Drawing Sheets

(56) References Cited

U.S. PATENT DOCUMENTS

| | | | |
|---|---|---|---|
| 2015/0011160 A1* | 1/2015 | Jurgovan | H04B 5/0031 |
| | | | 455/41.1 |
| 2015/0373483 A1* | 12/2015 | Verma | H04W 4/008 |
| | | | 455/41.3 |
| 2016/0048166 A1* | 2/2016 | Aliakseyeu | G06F 1/1632 |
| | | | 345/173 |
| 2016/0378704 A1* | 12/2016 | Adamson | G06F 13/364 |
| | | | 710/104 |
| 2017/0103495 A1* | 4/2017 | Sierra | G06T 1/20 |
| 2017/0344507 A1* | 11/2017 | Chen | G06F 13/4282 |
| 2018/0020320 A1* | 1/2018 | Choi | H04W 76/14 |

\* cited by examiner

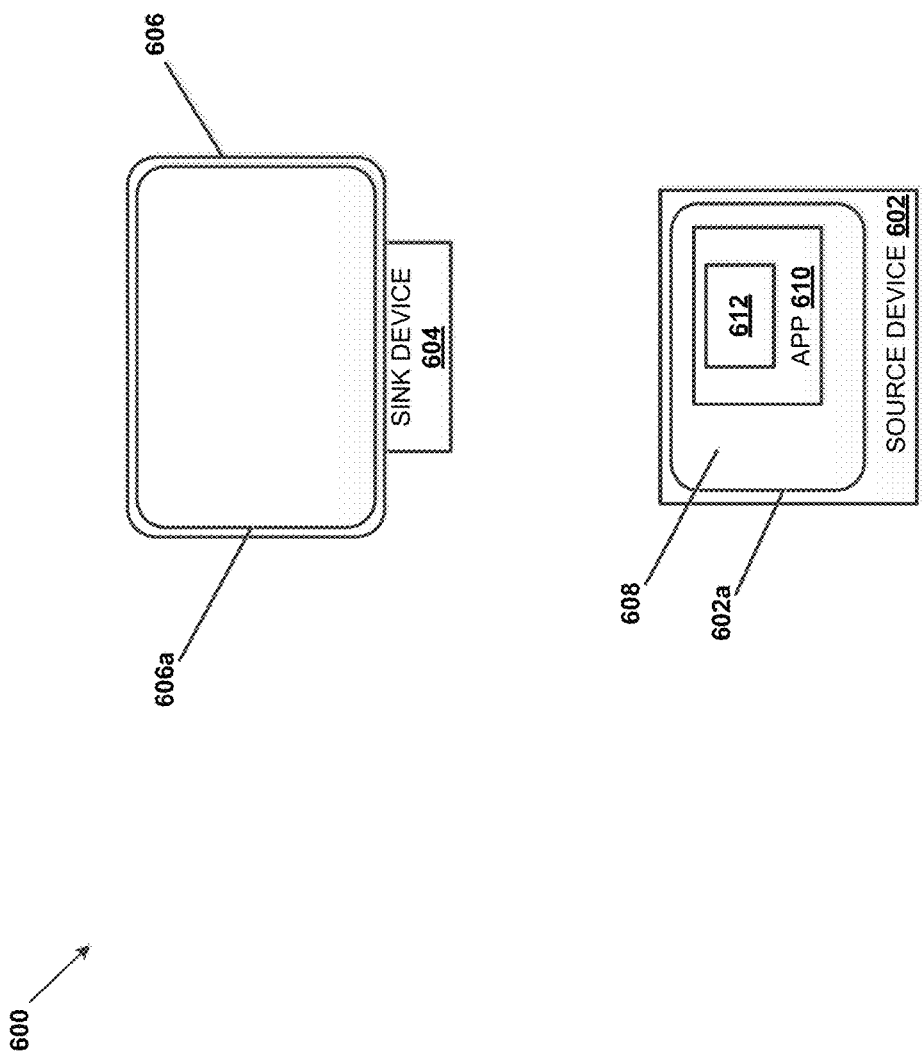

PROFILED WIRELESS DOCKING SYSTEM

BACKGROUND

The present disclosure relates generally to information handling systems, and more particularly to profiled wireless docking of information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often utilized for the provisioning and display of content. For example, source devices such as, for example, laptop/notebook computing devices, tablet computing devices, and/or mobile phones, may identify content to provide to sink devices such as, for example, projector systems, display systems (e.g., televisions), dongle systems, and/or content management systems, in order to have those sink devices provide that content for display on a display device (e.g., a display screen of the projector, a connected or integrated display device, etc.). In order to provide content to a sink device, a docking session may be initiated between the source device and the sink device. For example, the docking session may be established via direct physical and/or wireless connections between the source device and the sink device, and/or established via indirect physical and/or wireless connections that may couple the source device and the sink device to each other through a networking device (e.g., an access point), which can provide multiple communication paths on which to transmit content between the source device and the sink device.

Once the docking session is established, the source device may provide content to the sink device for display on a display device. Due to the various types and functionalities of source devices and sink devices, a user of the source device docking with and providing content to the sink device may have varying user experiences in establishing the docking session and sharing content with the sink device during that docking session. For example, docking sessions with publically available sink devices often results in a suboptimal user experience for the user of the source device because neither of the source device and the publically available sink device are configured to operate based on the functionality and limitations of each other. As such, a user of the source device must either settle for the limited functionality in the docking session that results, or spend significant amounts of time configuring either or both of the source device and the sink device for optimal docking session operation. One specific example of sub-optimal docking session operations include latency in the transmission of content information between the source device and sink device that can result from using and/or switching between any of the multiple communication paths that connect the source device and the sink device.

Accordingly, it would be desirable to provide an improved docking system.

SUMMARY

According to one embodiment, an information handling system (IHS) includes a communication subsystem that is configured to provide communication with source devices; a processing system that is coupled to the communication subsystem; and a memory system that is coupled to the processing system and that includes instructions that, when executed by the processing system, cause the processing system to provide a profiled wireless docking engine that is configured to: establish, via the communication subsystem, a wireless docking session with a source device that includes a source device screen; retrieve, from the source device, source device information about the source device; retrieve, from the source device, content information that is provided for display on the source device screen by the source device; determine a source device wireless docking profile based on the source device information and the content information; and provide the content information for display on a display device according to the source device wireless docking profile.

BRIEF DESCRIPTION OF THE DRAWINGS

FIG. 6 is a schematic view illustrating an embodiment of a source device displaying content information.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
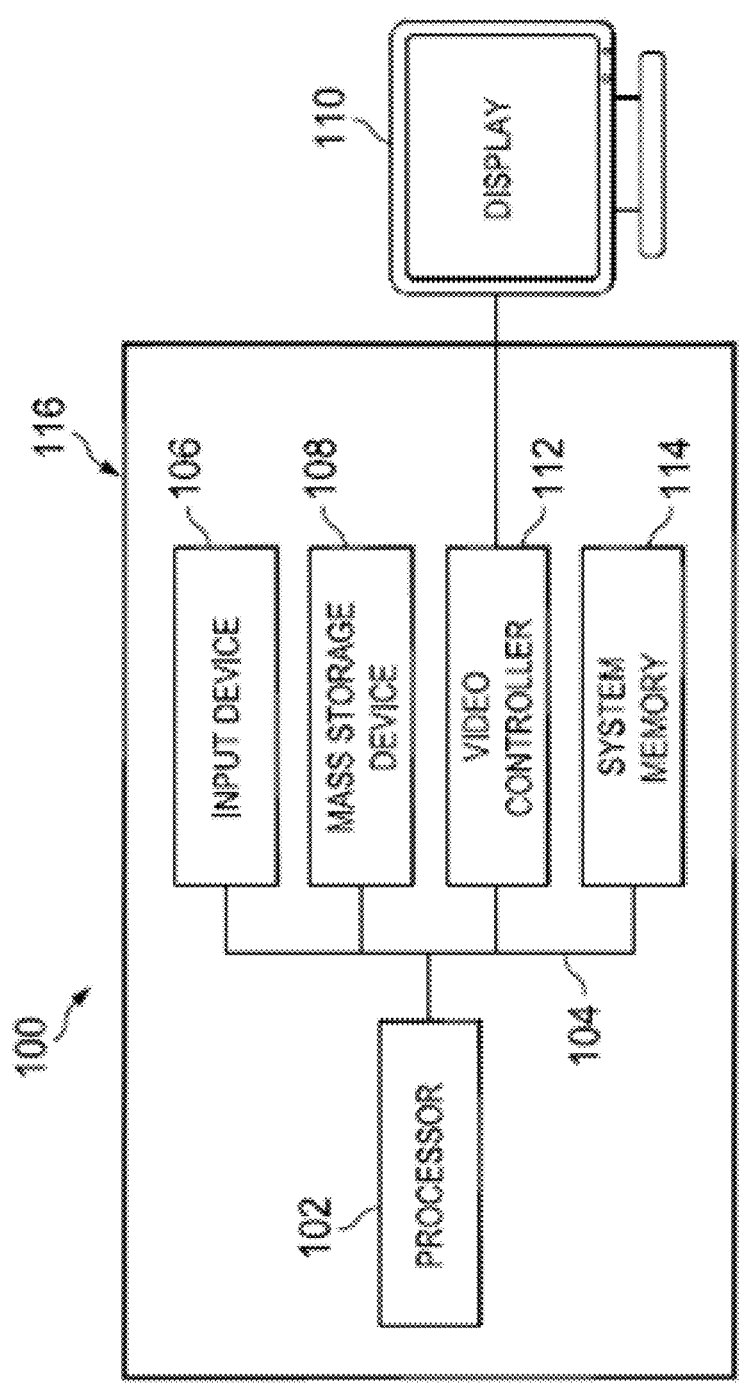
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as a mouse, pens, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
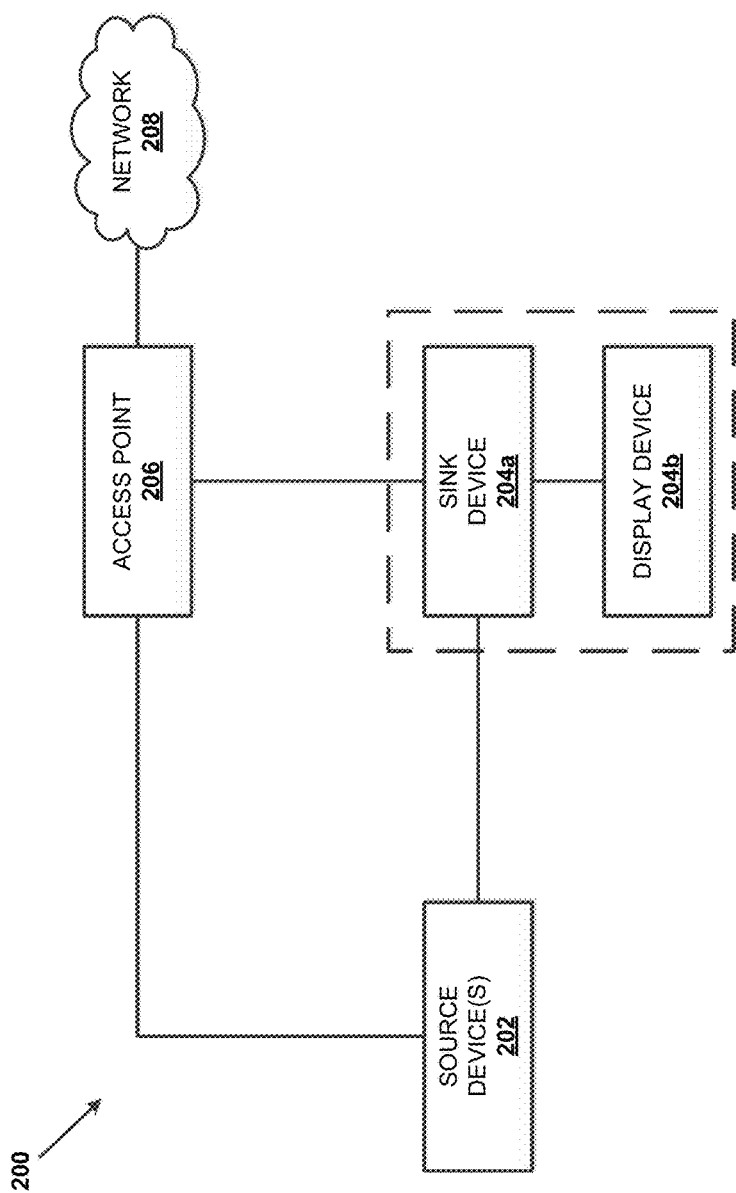
FIG. 2 is a schematic view illustrating an embodiment of a profiled wireless docking system.

Referring now to FIG. 2, an embodiment of a profiled wireless docking system 200 is illustrated that includes one or more source devices 202. In an embodiment, any or all of the source device(s) 202 may be the IHS 100 discussed above with reference to FIG. 1, and/or may include some or all of the components of the IHS 100. In the examples discussed below, the source device(s) 202 are described as mobile computing devices such as laptop/notebook computer devices, tablet computing devices, and mobile phones. However, in other embodiments, the source device(s) 202 may be provided by desktop computing devices, server computing devices, and/or a variety of other computing devices that would be apparent to one of skill in the art in possession of the present disclosure. The source device(s) 202 are configured for wireless communication with one or more sink devices 204a. Furthermore, in the embodiment illustrated in FIG. 2, the source device 202 is illustrated as being wirelessly docked with the sink device 204a.

In an embodiment, the sink device 204a may be the IHS 100 discussed above with reference to FIG. 1, and/or may include some or all of the components of the IHS 100. In the examples discussed below, the sink device 204a is described as a shared display system that may include a projector computing system, a dongle computing system (e.g., including a GOGGLE® CHROMECAST® dongle computing device, an AMAZON® FIRE TV STICK® dongle computing device, etc.), a television display system, a content management display system (e.g., including an APPLE TV® content management system), and other shared display systems know in the art. However, in other embodiments, the sink device 204a may be provided by a variety of other computing devices that include display screens that may be utilized by the source device(s) 202 as would be apparent to one of skill in the art in possession of the present disclosure.

In an embodiment, the coupling between the source device(s) 202 and the sink device 204a is a communicative coupling that provides for the transmission of source device information, content information, sink device information, peripheral device information, and other data between each of the source device(s) 202 and the sink device 204a as discussed below. In the examples provided below, the couplings between the source device(s) 202 and the sink device 204a are described as wireless couplings provided by wireless communication subsystems that may include WiFi communication subsystems, BLUETOOTH® communication subsystems, and/or other wireless communication subsystems known in the art. However, in other embodiments, the couplings between any or all of the source device(s) 202 and the sink device may be provided by wired connections, combined wireless/wired connections, and/or any other coupling that is configured to transmit the data as discussed below.

The sink device 204a is coupled to a display device 204b. In some embodiments, the sink device 204a and the display device 204b may be separate components such as, for example, the projector computing device/sink device and projector screen/display device, the dongle computing device/sink device and display device, and/or the content management computing device/sink device and display device described herein. However, in other embodiments, the sink device 204a and the display device 204b may be an integrated component (as illustrated by the dashed line in FIG. 2) such as, for example, the television display device and/or other computing devices described herein. As such, the coupling between the sink device 204a and the display device 204b that is illustrated in FIG. 2 need not be a physical coupling, but rather may be provided by positioning the sink device 204a appropriately relative to the display device 204b (e.g., as with a projector computing device/sink device positioned appropriately to provide images on a projector screen/display device). However, in some embodiments, the coupling between the sink device 204a and the display device 204b that is illustrated in FIG. 2 may be a physical external coupling such as a cable between the sink device 204a and the display device 204b (as is used with content management display systems), or a mated connection between the sink device 204a and the display device 204b (as is used with dongle computing systems). Furthermore, in some embodiments, the coupling between the sink device 204a and the display device 204b that is illustrated in FIG. 2 may be a physical internal coupling such as a coupling provided between a processing system and a display subsystem in a television display device and/or other computing device.

In the illustrated embodiment, the sink device 204a is coupled to an access point 206 that is further coupled to a network 208. In an embodiment, the access point 206 may be the IHS 100 discussed above with reference to FIG. 1, and/or may include some or all of the components of the IHS 100. In the examples discussed below, the access point 206 is described as a wireless access point that may be connected to or integrated in a router device. However, in other embodiments, the access point 206 may be provided by any networking device (wired or wireless) that provides for a connection to the network 208. While the network 208 is described in many of the examples below as the Internet, in some embodiments the network 208 may include a Local Area Network (LAN) or other network known in the art as well. As discussed below, the coupling between the sink device 204a and the access point 206 may include one or more wired communication paths, and/or one or more wireless communication paths such as, for example, a WiFi communication path, a Peer-To-Peer (P2P) communication path (e.g., a BLUETOOTH® communication path or Near Field Communication (NFC) path), and/or any of a variety of other communication paths known in the art. However, in some embodiments, the access point 206 may be omitted such that the profiled wireless docking system 200 includes source device(s) 202 coupled to the sink device 204a and display device 204b via a LAN and without access to the Internet. Furthermore, in some embodiments the sink device 204a and the access point 206 may be combined into an integrated component.

As also illustrated in FIG. 2, any or all of the source device(s) 202 may optionally be coupled directly to the access point 206 to access the network 208, and the optional coupling between any source device 202 and the access point 206 may include one or more wired communication paths, and/or one or more wireless communication paths such as, for example, a WiFi communication path, a Peer-To-Peer (P2P) communication path (e.g., a BLUETOOTH® communication path or Near Field Communication (NFC) path), and/or any of a variety of other communication paths known in the art. However, in some embodiments, the optional connection between the source device(s) 202 and the access point 206 may be omitted, and the source device(s) 202 may be coupled to the access point 206 through the sink device 204a to access the network 208 as discussed below. Thus, while a specific embodiment of the profiled wireless docking system 200 is illustrated and described herein, one of skill in the art in possession of the present disclosure will recognize that a wide variety of modification to the components and configuration of the profiled wireless docking system 200 will fall within the scope of the present disclosure.

Figure 3:
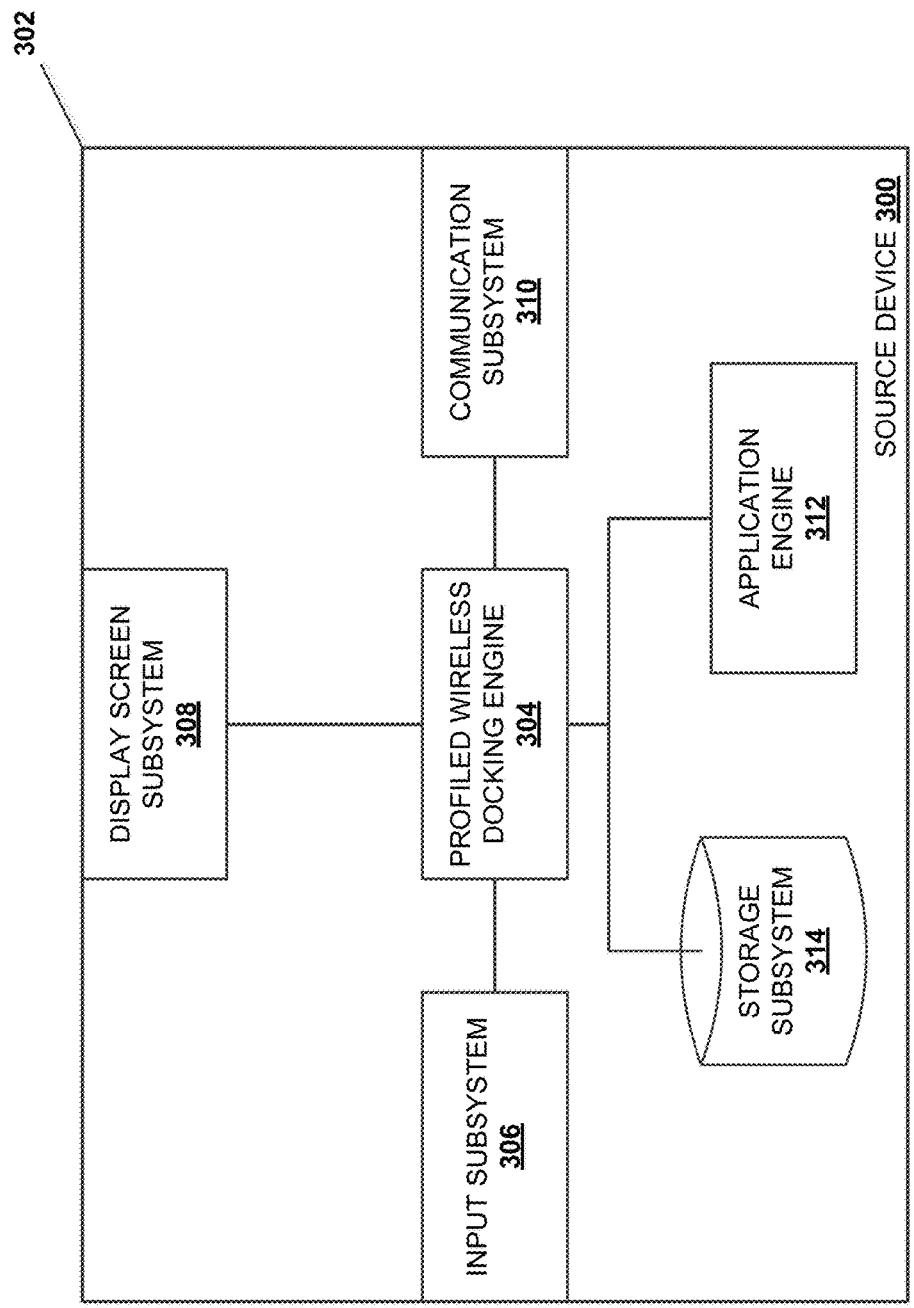
FIG. 3 is a schematic view illustrating an embodiment of a source device used in the profiled wireless docking system of FIG. 2.

Referring now to FIG. 3, an embodiment of a source device 300 is illustrated that may be any of the source device(s) 202 discussed above with reference to FIG. 2. As such, the source device 300 may be the IHS 100 discussed above with reference to FIG. 1, and/or may include some or all of the components of the IHS 100. As discussed above, while the source device 300 is described below as a mobile computing device such as a laptop/notebook computer device, tablet computing device, and mobile phone, the source device 300 may be provided by desktop computing devices, server computing devices, and/or a variety of other computing devices that would be apparent to one of skill in the art in possession of the present disclosure. In the illustrated embodiment, the source device 300 includes a chassis 302 that houses the components of the source device 300, only some of which are illustrated in FIG. 3. For example, the chassis 302 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a profiled wireless docking engine 304 that is configured to perform the functions of the profiled wireless docking engines and source devices discussed below. In a specific example, the processing system may include a graphics processing unit (GPU) that is configured to render content information as discussed below.

The chassis 302 also houses an input subsystem 306 that is coupled to the profiled wireless docking engine 304 (e.g., via a coupling between the processing system and the input subsystem 306). In an embodiment, the input subsystem 306 may be provided by a keyboard input subsystem, a mouse input subsystem, a track pad input subsystem, a touch input display subsystem, and/or any other input subsystem known in the art. The chassis 302 also houses a display screen subsystem 308 that is coupled to the profiled wireless docking engine 304 (e.g., via a coupling between the processing system and the display screen subsystem 308). In an embodiment, the display screen subsystem 308 may be provided by a display device that is integrated into the source device 300 and that includes a display screen (e.g., a display screen on a laptop/notebook computing device, a tablet computing device, or a mobile phone), or by a display device that is coupled directly to the source device 300 (e.g., a display device coupled to a desktop computing device by a cabled or wireless connection). The chassis 302 also houses a communication subsystem 310 that is coupled to the profiled wireless docking engine 304 (e.g., via a coupling between the processing system and the communication subsystem 310). In an embodiment, the communication subsystem 310 may be provided by a wireless communication subsystem (e.g., a WiFi communication subsystem, a BLUETOOTH® communication subsystem, and/or other wireless communication subsystems known in the art), a network interface controller (NIC), and/or other communication subsystems known in the art.

In an embodiment, the memory system may also include instructions that, when executed by the processing system, cause the processing system to provide an application engine 312 that is configured to perform the functions of the application engines and source devices discussed below. The application engine 312 may provide any of a variety of applications known in the art on the source device 300, and may be configured to communicate with the profiled wireless docking engine 304 as discussed below. In a specific example, the application engine 312 may provide an operating system for the source device 300, as well as particular applications used in the examples discussed below. The chassis 302 may also house storage device (not illustrated, but which may be the storage device 108 discussed above with reference to FIG. 1) that provides a storage subsystem 314 that is configured to store the source device information, the content information, as well as other data utilized by components (e.g., the application engine 312) in the source device 300. While a specific embodiment of the source device 300 is illustrated and described herein, one of skill in the art in possession of the present disclosure will recognize that a wide variety of modification to the components and configuration of the source device 300 will fall within the scope of the present disclosure.

Figure 4:
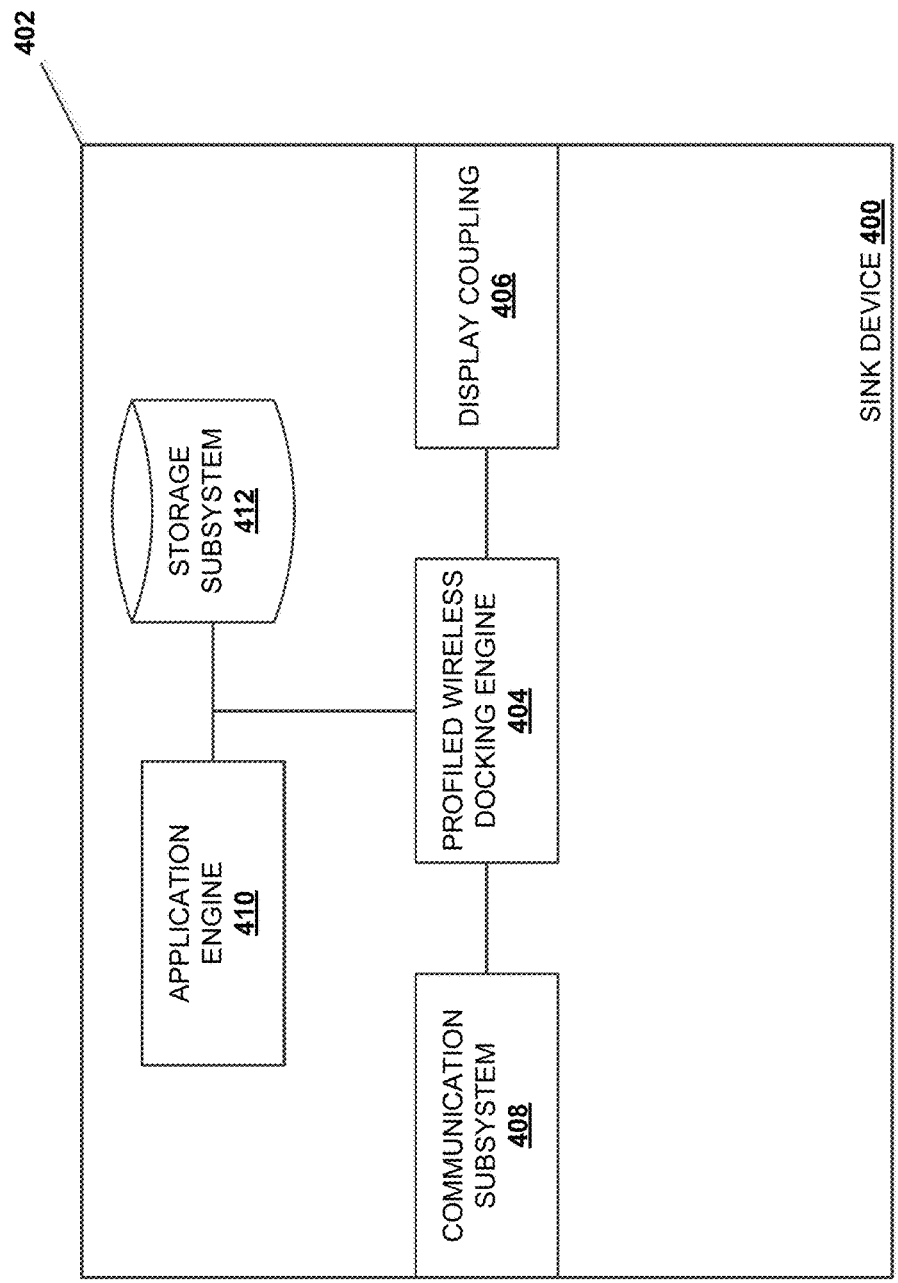
FIG. 4 is a schematic view illustrating an embodiment of a sink device used in the profiled wireless docking system of FIG. 2.

Referring now to FIG. 4, an embodiment of a sink device 400 is illustrated that may be the sink device 204a discussed above with reference to FIG. 2. As such, the sink device 400 may be the IHS 100 discussed above with reference to FIG. 1, and/or may include some or all of the components of the IHS 100. As discussed above, while the sink device 400 is described as at least part of a shared display system such as projector computing system, a dongle computing system, a television display system, and a content management display system, the sink device 400 may be provided by a variety of other computing devices that include display screens that may be utilized by one or more source device(s) as discussed below. In the illustrated embodiment, the sink device 400 includes a chassis 402 that houses the components of the sink device 400, only some of which are illustrated in FIG. 4. For example, the chassis 402 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a profiled wireless docking engine 404 that is configured to perform the functions of the profiled wireless docking engines and sink devices discussed below. In a specific example, the processing system may include a System on Chip (SoC) and/or a graphics processing unit (GPU) that is configured to render content information for display as discussed below.

The chassis 402 also houses a display coupling 406 that is coupled to the profiled wireless docking engine 404 (e.g., via a coupling between the processing system and the display coupling 406). In an embodiment, the display coupling 406 may be provided by an external connector (e.g., that is configured to connect to the display device 204b via a display cable, configured to connect directly to an external connector on the display device 204b, etc.), an internal connector (e.g., between the processing system and the display device 204b that is integrated with the sink device 400), an image projection component (e.g., a projector lens), and/or a variety of other display couplings that would be apparent to one of skill in the art in possession of the present disclosure. The chassis 402 also houses a communication subsystem 408 that is coupled to the profiled wireless docking engine 404 (e.g., via a coupling between the processing system and the communication subsystem 408). In an embodiment, the communication subsystem 408 may be provided by a wireless communication subsystem (e.g., a WiFi communication subsystem, a BLUETOOTH® communication subsystem, and/or other wireless communication subsystems known in the art), a network interface controller (NIC), and/or other communication subsystems known in the art.

In some embodiments, the memory system may also include instructions that, when executed by the processing system, cause the processing system to provide an application engine 410 that is configured to perform the functions of the application engines and sink devices discussed below. The application engine 410 may be configured to provide any of a variety of applications known in the art on the sink device 400, and may be configured to communicate with the profiled wireless docking engine 404 as discussed below. For example, the application engine 410 in the sink device 400 may be configured to execute applications locally in the sink device 400 that are also being executed on a source device in order give the appearance of the "sharing" of those applications by the source device(s) on the display device 204b. The chassis 402 may also house a storage device (not illustrated, but which may be the storage device 108 discussed above with reference to FIG. 1) that provides a storage subsystem 412 that is configured to store the source information, content information, and networking device information discussed below as well as other data utilized by components (e.g., the application engine 410) in the sink device 400. While a specific embodiment of the sink device 400 is illustrated and described herein, one of skill in the art in possession of the present disclosure will recognize that a wide variety of modification to the components and configuration of the sink device 400 will fall within the scope of the present disclosure.

Figure 5:
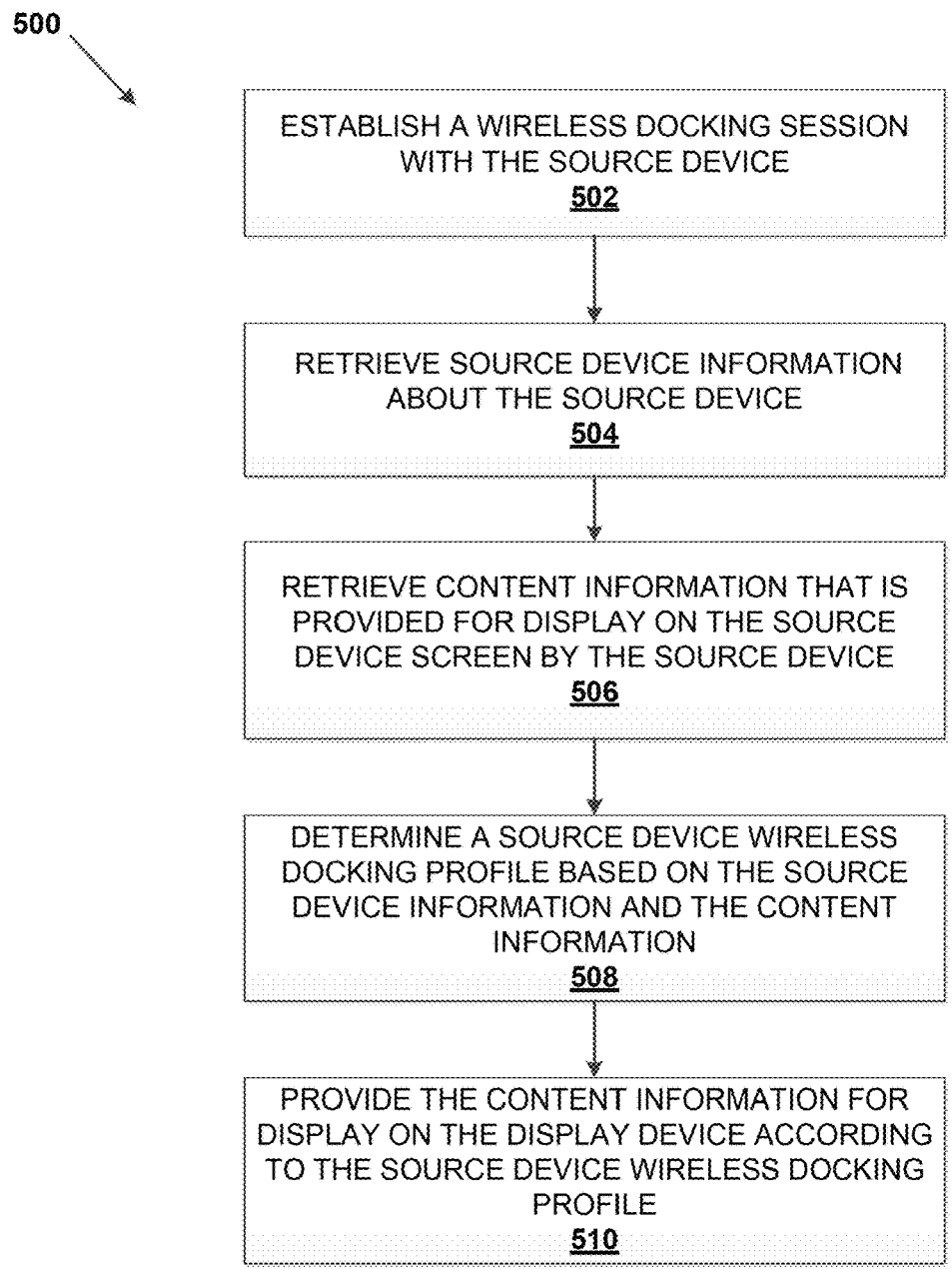
FIG. 5 is a flow chart illustrating an embodiment of a method for providing profiled wireless docking.

Referring now to FIG. 5, an embodiment of a method 500 for profiled wireless docking is illustrated. As discussed above, due to the various types and functionalities of source devices and sink devices, a user of a source device docking with and providing content to a sink device may have varying user experiences in establishing the docking session and sharing content with the sink device during a docking session. As such, a user of the source device must either settle for the limited functionality in the docking session that results, or spend significant amounts of time configuring either or both of the source device and the sink device for optimal docking session operation. The systems and methods of the present disclosure provide for profiled wireless docking via sink devices that generate wireless docking profiles based on the functionality of the sink device, the source device, any networking devices providing communication paths between the sink device and the source device, as well as location information, system specific information, and/or other information that one of skill in the art in possession of the present disclosure would recognize would provide the functionality discussed below. The wireless docking profiles may then be used to generate a customized user experience that is unique to the specific sink device and source device involved in a docking session. For example, the sink device may provide content information that was received from the source device for display on a display device in a customized format that is based on the wireless docking profile. In another example, the sink device may determine and configure an optimal communication path between itself and the source device based on the wireless docking profile.

The method 500 begins at block 502 where a sink device establishes a wireless docking session with a source device. Referring now to FIG. 6, an embodiment of a profiled wireless docking system 600 is illustrated that includes a source device 602 having a source device display screen 602a. The profiled wireless docking system 600 also includes a sink device 604 and a display device 606 having a display screen 606a. In the illustrated embodiment, the source device 602 includes an operating system 608 and is providing an application 610 that includes content 612 for display on its source device display screen 602a (e.g., via its application engine 312).

In an embodiment of block 502, the sink device 604 may operate to establish communication with the source devices 602. For example, with reference to FIGS. 3 and 4, the profiled wireless docking engine 404 in the sink device 400 and the profiled wireless engine 304 in the source device 300 may communicate wirelessly via the communication subsystems 408 and 308, respectively, in order to establish communication. In a specific example, the establishment of communications between the source device 602 and the sink device 604 may be performed according to the teachings of U.S. patent application Ser. No. 15/274,426, filed on Sep. 23, 2016, the disclosure of which is incorporated by reference in its entirety. As such, following block 502, the source device 602 may have paired (e.g., via a BLUETOOTH® pairing process), connected (e.g., via a WiFi networking device), logged into (e.g., by providing authentication information that is validated by the profiled wireless docking engine 404 in the sink device 400), and/or otherwise connected to the sink device 604 such that content information may be passed between that source device 602 and the sink device 604 as discussed below.

Figure 7A:
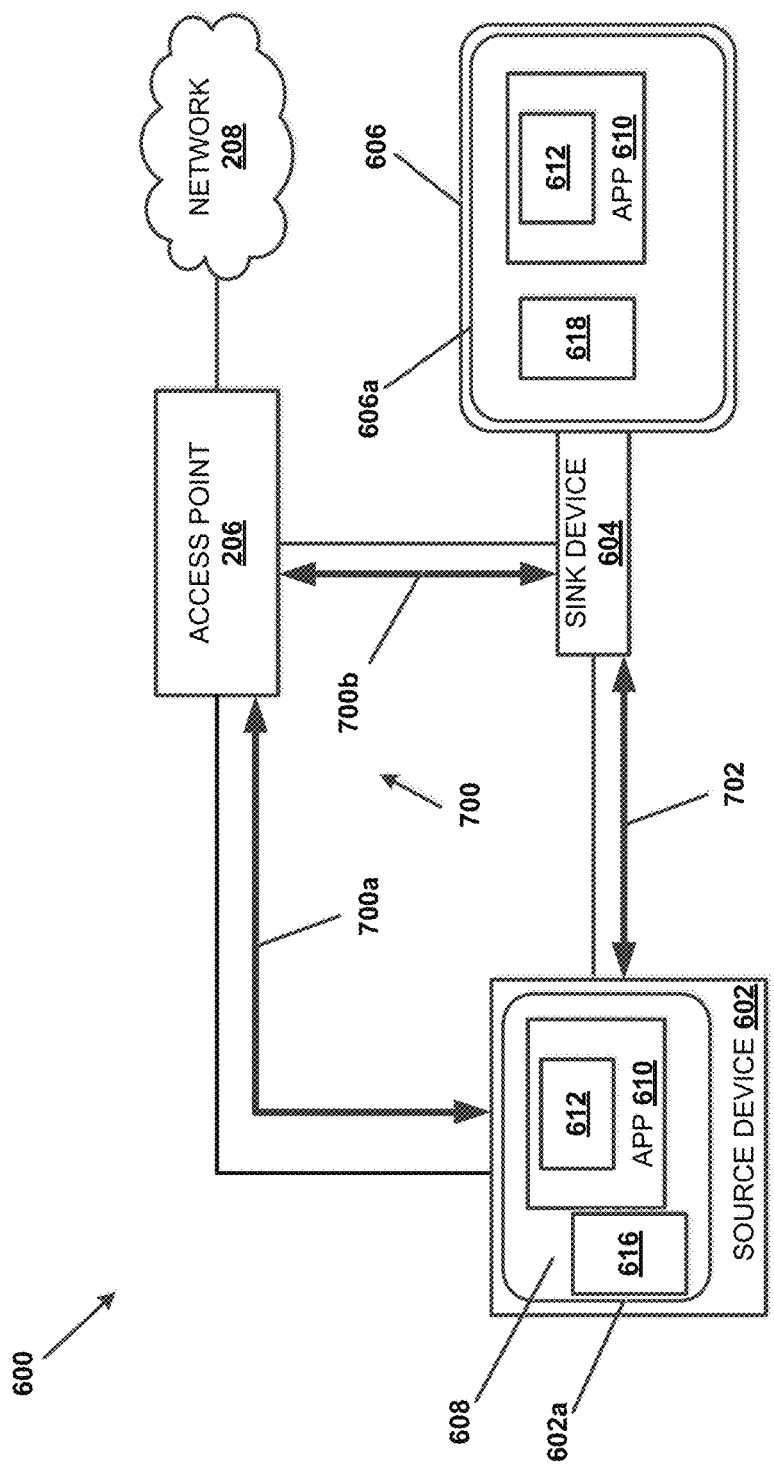
FIG. 7A is a schematic view illustrating an embodiment of the retrieval of content information through a first communication path by a sink device for display on a display device, as well as the retrieval of sink device information by the source device of FIG. 6 to generate a graphical user interface for display at the source device.
Figure 7B:
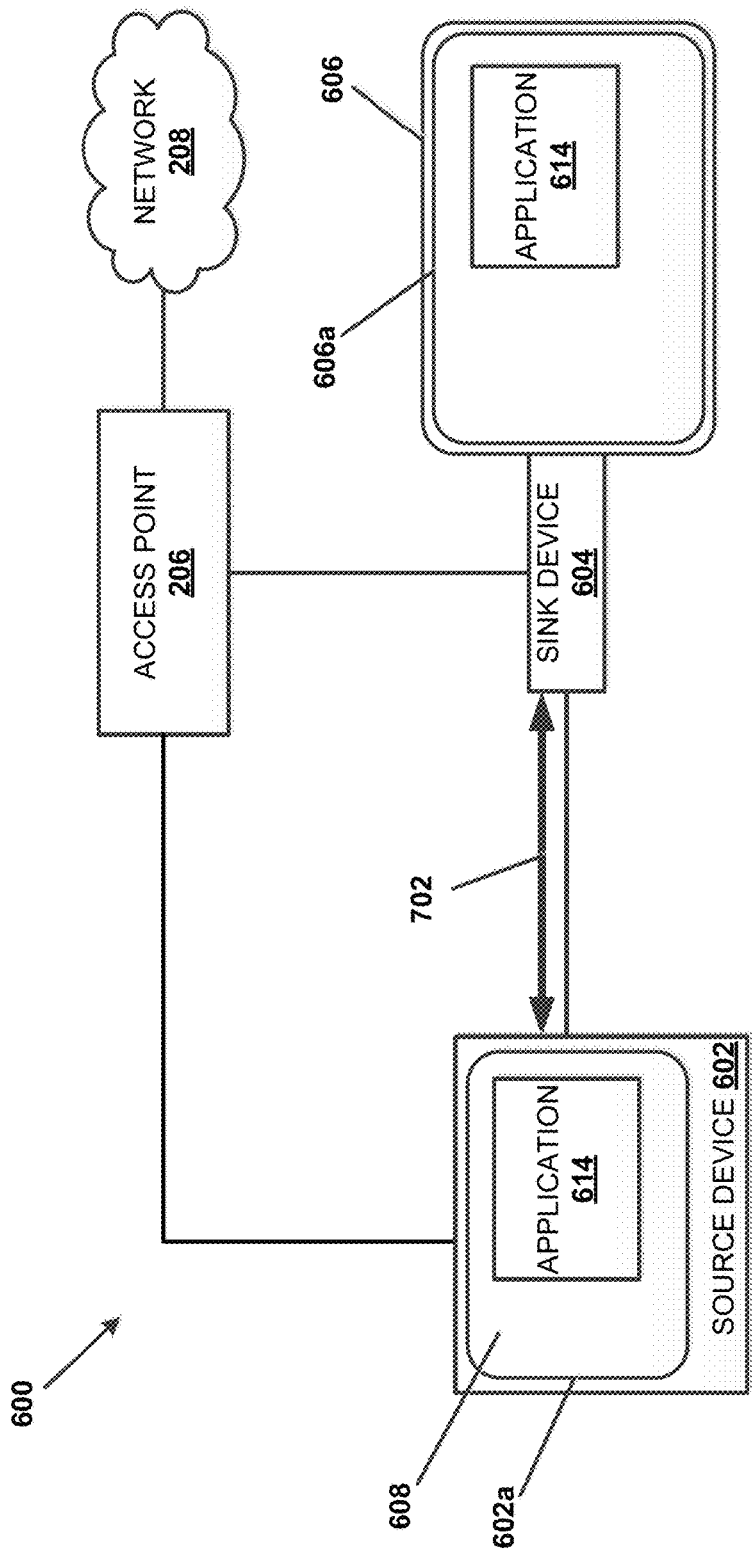
FIG. 7B is a schematic view illustrating an embodiment of retrieval of content information by a sink device for display through a second communication path.

In an embodiment of block 502, the establishment of the wireless docking session with the source device 602 by the sink device 604 may include establishing multiple communication paths such as, for example, a first communication path with the source device 604 and a second communication path with the source device 604. Referring now to FIGS. 7A and 7B, an embodiment of an established wireless docking session between the source device 602 and the sink device 604 is illustrated. FIGS. 7A and 7B illustrate a wireless docking session established between the source device 602 and the sink device 604 via a first communication path 700 that may be a WiFi communication path that is provided through the access point 206 (as illustrated by the bolded arrow 700a from the source device 602 to the access point 206, and the bolded arrow 700b from the access point 206 to the sink device 604). The wireless docking session established between the source device 602 and the sink device 604 may also include a second communication path 702 provided by a P2P communication connection (e.g., via a BLUETOOTH® communication connection). While specific examples of a wireless docking session that includes multiple communication paths between a sink device and a source device are illustrated, one of skill in the art in possession of the present disclosure will recognize that a wide variety of communication paths (including single communication paths) and configurations of wireless docking sessions between source devices and sink devices will fall within the scope of the present disclosure.

The method 500 then proceeds to block 504 where the sink device retrieves source device information about the source device. In an embodiment of block 504, the sink device 604 may retrieve source device information about the source device 602 from the source device 602 once the wireless docking session between the source device 602 and the sink device is established. However, in other embodiments, the sink device 604 may retrieve source device information from a variety of other devices other than the source device 602 for which that source device information applies when, for example, that source device information has been previously retrieved, stored, or otherwise provided in the other device(s) based on previously interactions with the source device associated with that source device information. For example, the sink device 604 may retrieve source device information from a local and/or a global database, over the network 208, from the networking device 206, and/or from any other sink device and/or source device (i.e., a source device that is not associated with that source device information) included in the profiled wireless docking system 600. The source device information may identify a source device type of the source device 602 (e.g., a mobile phone source device type, a tablet computing system source device type, a laptop/notebook computing system source device type, etc.), an operating system used on the source device 602, a user profile that includes user information and preferences for a user associated with the source device 602, one or more hardware capabilities of the source device 602, peripheral device information about peripherals devices attached to the source device 602, a source device configuration (e.g., open or closed laptop), positional data of the source device 602 via sensors, relative location of the sink device to the sink device 604 and other source devices/sink devices, and any other information that may describe characteristics, functionality, and/or other details of a source device that would be apparent to one of skill in the art in possession of the present disclosure.

In another embodiment of block 504, the sink device 604 may retrieve the source device information about the source device 602 before the wireless docking session is established. For example, prior to the method 500, the sink device 604 may establish an initial wireless communication session with the source device 602. In a specific example, the sink device 604 may establish the initial wireless communication session with the source device 602 directly via one or more wireless communication protocols such as, for example, a WiFi communication protocol, a Peer-To-Peer (P2P) communication protocol (e.g., a BLUETOOTH® communication protocol or Near Field Communication (NFC) protocol), and/or any of a variety of other communication protocols known in the art. In another example, if the sink device 604 is not in a communication range of the source device 602, the initial wireless communication session between the sink device 604 and the source device 602 may be established through another sink device (e.g., data for establishing the initial wireless communication session between the source device 602 and the sink device 604 may be routed through another sink device). In yet another example, the initial wireless communication between the sink device 604 and the source device 602 may be established through the access point 206 (e.g., through a direct connection between the access point 206 and the source device 602, through the network 208, through other sink devices, and/or using other wireless communication methods known in the art).

In some embodiments, the initial wireless communication session may be established using a limited wireless communication connection procedure performed by the sink device 604 that results in the sink device 604 only retrieving source device information that is necessary to determine the wireless docking profile discussed below. For example, the establishment of the initial wireless communication session may include the sink device 604 monitoring its environment (e.g., monitoring for signals in a communication range of the sink device 604) and receiving a source device identifier advertised by the source device 602. In other examples, the establishment of initial wireless communication session may further include the sink device 604 performing a wireless communication connection procedure to retrieve other source device information from the source device 602 that may be used to determine the wireless docking profile for the source device 602 and/or the sink device 604. One skilled in the art in possession of the present disclosure will recognize that the initial wireless communication session may involve a variety of wireless communication connection procedures that allow for the determination of the wireless docking profile discussed prior to, or following, the establishment of the wireless docking session discussed above.

Referring to FIGS. 7A and 7B, the sink device 604 may retrieve source device information about the source device 602 prior to and/or following the establishment of a wireless docking session between the source device 602 and the sink device 604. In the specific example illustrated in FIGS. 7A and 7B, the source device information may identify that the source device type of the source device 602 is a tablet computing device, that the source device 602 includes no attached peripheral devices, that the source device 602 includes an operating system 608 ("OS1"), that the source device 602 is running the application 610, and that the source device 602 is being operated by user A that is associated with a user profile and preferences for user A when the source device 602 is docked to a public sink device such as the sink device 604 in this example. The sink device 604 may receive the source device information via the first communication path 700 (i.e., 700a and 700b) via the access point 206 and/or via the second communication path 702 directly from the source device 602.

The method 500 then proceeds to block 506 where the sink device retrieves content information that is provided for display on the source device display screen by the source device. In an embodiment, at block 506, the application engine 312 in the source device 300/602 may generate content information in the form of an operating system desktop, an application, and/or a variety of other types of content information known in the art, and the profiled wireless docking engine 304 in the source device 300/602 may detect that content information and send an identification of that content information through the communication subsystem 310 to the sink device 604. The profiled wireless docking engine 404 in the sink device 400/604 may then receive that identification though the communication subsystem 408 at block 506. In different embodiments, the identification of content information at block 506 may be performed in a variety of manners and may include a variety of different information related to the content information. Referring now to FIG. 6, the application engine 312 in the source device 300/602 is illustrated as operating to provide content information on the source device display screen 602a that includes an operating system desktop 608, along with an application 610 (e.g., an Internet browser, a word processor, a media player, a spreadsheet application, etc.) that includes content 612. However, one of skill in the art in possession of the present disclosure will recognize that any of a variety of content information may be provided by the source device 602 using any of a variety of methods while remaining within the scope of the present disclosure.

In one embodiment of the retrieval of content information at block 506, the application engine 312 in the source device 300/602 may operate to identify the entire source device display screen 602a as the content information. For example, the profiled wireless docking engine 304 may provide a Graphical User Interface (GUI) that allows the user of the source device 300/602 to identify content information to the sink device 400/604, and an option on that GUI to identify or "share" the entire screen (e.g., all of the content information provided for display on the source device display screen 602a such as the operating system desktop 608 and the application 610 with the content 612 as illustrated in FIG. 6) may be selected by the user. In some embodiments, a user choosing to share the entire source device display screen 602a may be given the option to select portions of the content information provided for display on the source device display screen 602a to remove those portions from the content information that is retrieved at block 506 (e.g., to prevent from sharing those portions of the content information). For example, a user choosing to share the entire source device display screen 602a may select the application 610 to allow for retrieval of the operating system desktop 608 as content information at block 506 without including the application 610 providing the content 612 as part of that content information (that will later be shared on the display device 606 as discussed below.)

In another embodiment of the retrieval of content information at block 506, the application engine 312 in the source device 300/602 may operate to identify applications that are being provided for display on the source device display screen 602a as the content information. For example, the profiled wireless docking engine 304 may provide the Graphical User Interface (GUI) that allows the user of the source device 300/602 to identify content information to the sink device 400/604, and an option on that GUI to identify or "share" one or more applications (e.g., the application 610 including the content 612 as illustrated in FIG. 6) may be selected by the user along with the selection of an application (e.g., by selecting any portion of the application displayed on the source device display screen 602a). In some embodiments, a user choosing to share an application may be given the option to select portions of the application that are provided for display on the source device display screen 602a to remove those portions from the content information that is retrieved at block 506 (e.g., to prevent from sharing those portions of the content information). For example, a user choosing to share an Internet browser application that includes a plurality of different Internet browser tabs may select one or more of the Internet browser tabs on the Internet browser application to allow for identification of the Internet browser as content information at block 506 without including the selected Internet browser tab(s) as part of that content information (that will later be shared on the display device 204b as discussed below.)

In yet another embodiment of the retrieval of content information at block 506, the application engine 312 in the source device 300/602 may operate to retrieve a portion of the source device display screen 602a as the content information. For example, the display engine 304 may provide the Graphical User Interface (GUI) that allows the user of the source device 300/602 to identify content information to the sink device 400/604, and an option on that GUI to identify or "share" a portion of the screen may be selected by the user. Following that selection, the user may utilize the input subsystem 306 (e.g., a mouse) to manipulate an input element to define a content information area on the source device display screen 602a that identifies the portion of the source device display screen 602a (e.g., a content information area (i.e., a selection "box") including a portion of the operating system desktop 608 as well as some or all of the application 610 including the content 612, while excluding the remainder of the operation system desktop 608 and possibly the application 610, in this example) that will be identified to the sink device 400/604 as content information at block 506. In some embodiments, a user choosing to share a portion of the source device display screen 602a may be given the option to select sub-portions of content information in the content information area that will be identified for display on the source device display screen 602a to remove those sub-portions from the content information that is identified at block 506 (e.g., to prevent from sharing those sub-portions of the content information). For example, a user choosing to share the content information included in the content information area on the source device display screen 602a may select the application 610 to allow for identification of the portion of the operating system desktop 608 in the content information area as content information at block 506 without including the application 610 providing the Internet content 612 as part of that content information (that will later be shared on the display device 204b as discussed below.)

Referring to FIG. 7A, in one embodiment the user of the source device 602 may wish to share content information with the sink device 604 that includes the application 610 (e.g., an Internet browser) including the content 612. As discussed previously, the wireless docking session between the source device 602 and the sink device 604 may include a first communication path 700 (i.e., 700a and 700b) through the access point 206, and a second communication path 702 directly with the sink device 604. As illustrated in FIG. 7A, at least a portion of the content information that includes the application 610 and the content 612 may be provided by the source device 602 to the sink device 604 (or retrieved by the sink device 604 from the source device 602) through the first communication path 700. Referring to FIG. 7B, in another embodiment the user of the source device 602 may wish to share content information that includes application 614 (e.g., a gaming application) with the sink device 604, and at least a portion of the content information that includes the application 614 may be provided by the source device 602 to the sink device 604 (or retrieved by the sink device 604 from the source device 602) through the second communication path 702.

The method 500 then proceeds to block 508 where the sink device determines a source device wireless docking profile based on the source device information and the content information. In an embodiment of block 508, the sink device 604 determines a source device wireless docking profile based on the source device information and the content information. For example, the source device wireless docking profile may include information that provides for a configuration of the wireless docking session between the sink device 604 and the source device 602 based on the source device information and the content information. As such, in many situations the wireless docking profile may be unique to the source device 602 and the sink device 604 combination. Furthermore, wireless docking profiles may be dynamic such that they are updated (i.e., the information that provides for the configuration of an associated wireless docking session is updated) based on any changes to the source device information and/or content information. In addition to the wireless docking profiles being dynamic, user preferences may be applied automatically to new sink devices based on previous source device 602 and sink device 604 interactions.

In an embodiment, the profiled wireless docking system 600 may include a networking device (e.g., the access point 206) that may provide networking device information to the sink device 604 for use in determining wireless docking profiles. For example, the networking device information may include a networking device type of the networking device, hardware capabilities of the networking device, a bandwidth available to the networking device, a throughput available to the networking device, a latency associated with the networking device, a jitter associated with the networking device, an error rate associated with the networking device, and/or any other networking device information known in the art. The sink device 604 may then use the networking device information in addition to the content information and the source device information in order to determine the source device wireless docking profile at block 508.

In another embodiment, the source device 602 may be coupled to one or more peripheral devices, and peripheral device information about those peripheral device(s) may be used to determine wireless docking profiles. For example, a mouse, a keyboard, a speaker system, a microphone, a camera, and/or any other peripheral device known in the art may be coupled to the source device 602, and at block 508 the sink device 604 may retrieve peripheral device information about those peripheral devices through the source device 602. The peripheral device information may include a peripheral device type of any or all of the peripheral device(s), hardware capabilities of any or all of the peripheral device(s), a state of any or all of the peripheral device(s) (e.g., active or inactive), and/or any other peripheral device information associated with peripheral devices that would be apparent to one of skill in the art in possession of the present disclosure. The sink device 604 may then use the peripheral device information in addition to the content information and the source device information in order to determine the source device wireless docking profile at block 508.

In another embodiment, the sink device 604 may determine the source device wireless docking profile at block 508 based on sink device information, which may include a sink device type of the sink device 604, software capabilities of the sink device 604, hardware capabilities of the sink device 604, location information that describes a location of the sink device 604, attached display devices and/or other peripherals coupled to the sink device 604, and/or any other sink device information that would be apparent to one of skill in the art in possession of the present disclosure. The profiled wireless docking engine 404 of the sink device 400/604 may then determine the source device wireless docking profile at block 508 based on the source device information, the content information, the networking information, the peripheral device information, the sink device information, and/or any other information that would enable the functionality discussed below and that would be apparent to one of skill in the art of the present disclosure. In some embodiments, the profiled wireless docking engine 404 may be configured with a set of predefined instructions that are configured to generate the source device wireless docking profile based on the source device information, the content information, and/or any of the other information discussed above. As such, the source device wireless docking profile may be associated with a set of rules, thresholds, and/or instructions that define how the sink device 604 is to present content information on the display device 606, communicate with the source device 602, retrieve content information from the source device 602, provide experiences that leverage the peripheral devices of the source device and/or sink device, and/or otherwise interact with the source device 602.

In an embodiment, the profiled wireless docking engine 404 in the sink device 400/604 may be configured with one or more security levels by an administrator. For example, security levels may be provided with the sink device 604 and configured to generate the source device wireless docking profile for the source device 602 based on information associated with those security levels. In a specific example, security levels may require users to present credentials that authorize use of the sink device 604, which may associate a first level of authorization that provides a first level of functionality of the sink device 604 that may be different than a second level of authorization that provides a second level of functionality of the sink device 604 (i.e., that is provided for users that do not have credentials for the sink device 604, or that is provided for users that have a higher level of security clearance). Security levels may be implemented via information technology managed software and server distribution of source device wireless docking profiles.

In another embodiment, the sink device 604 may provide sink device information to the source device 602, and the profiled wireless docking engine 304 of the source device 300/602 may operate similarly as discussed above to determine a sink device wireless docking profile for the sink device 604 based on the sink device information, content information provided to the sink device 604 by the source device, networking information associated with the networking device, peripheral device information associated with peripheral devices connected to the source device 602 and/or the sink device 604, source device information associated with the source device 602, and/or any other information that may be used to provide the functionality discussed below that would be apparent to one of skill in the art of the present disclosure. The profiled wireless docking engine 304 of the source device 300/602 may also be provided with a set of predefined instructions that are configured to generate the sink device wireless docking profile based on the sink device information, the content information, and/or any of the other information discussed above. As such, the sink device wireless docking profile may be associated with a set of rules, thresholds, and/or instructions that define how the source device 602 is to present content information on the display device 606, communicate with the sink device 604, provide content information from the sink device 604, initiate applications, and/or otherwise interact with the sink device 604.

Referring to FIG. 7A, in an embodiment, the sink device 604 may determine a first source device wireless docking profile using a first set of rules for displaying the content information on the display device 606 based on the source device information associated with the source device 602 and the content information associated with the content displayed by the source device 602 on the source device display screen 602a. For example, the content information displayed by the source device 602 on the source device display screen 602a may initially include the application 610 (e.g., an Internet browser) including the content 612. If the user of the source device 602 operates the source device 602 to switch from providing the application 610 of FIG. 7A for display on the source device display screen 602a to providing the application 614 (e.g., a gaming application) of FIG. 7B for display on the source device display screen 602a, the content information may be updated and provided to the sink device 602. The sink device 602 may then determine a second source device wireless docking profile using a second set of rules for providing content on the display device 606 as well as the source device information and the updated content information.

The method 500 then proceeds to block 510 where the sink device provides the content information for display on the display device according to the source device wireless docking profile. In an embodiment, the profiled wireless docking engine 404 in the sink device 400/604 operates at block 510 to provide the content information through the display coupling 406 to the display device 204b/606 according to the source device wireless docking profile. In an embodiment, the source device wireless docking profile may be used by the profiled wireless docking engine 404 to generate a customizable graphical user interface at the sink device 604. For example, the sink device 604 may display the content information on the display device 606 according to the source device wireless docking profile such that the content information (e.g., the application 610) is provided for display on the display device 606 at a specific location on the display device, the content information is provided for display on the display device 606 with a defined size, the content information is provided for display on the display device 606 with a defined aspect ratio, the content information is provided for display on the display device 606 with certain subsets of the content information displayed while other subsets are not, the content information is provided for display on the display device 606 with supporting applications that are provided by the sink device 604 displayed, and/or using any other customization of a graphical interface that would be apparent to one of skill in the art in possession of the present disclosure. In another example, when a plurality of source devices 602 are connected to the sink device 604 (e.g., when the sink device 604 is a wireless projector), the sink device 604 may automatically retrieve or access shared permissions, meeting invites, and/or other information that may be included in the source device information gathered from one or more of the plurality of source device 602 to create a shared collaboration session. In a specific example, the shared collaboration session provided for the plurality of source devices 602 and the sink device 604 may be performed according to the teachings of U.S. patent application Ser. No. 15/266,376, filed on Sep. 15, 2016, the disclosure of which is incorporated by reference in its entirety.

Referring to FIG. 7A, in some embodiments the profiled wireless docking engine 404 of the sink device 400/604 may determine the source device wireless docking profile for the source device 602 based on the content information, the source device information associated with the source device 602, and/or any of the other information discussed above. In a specific example, the source device wireless docking profile determined by the sink device 604 (or the source device 602) may cause an application 618 to be launched on the display device screen 606a of the display device 606 based on the application 610 being associated with the content information that was identified by the sink device 604 to be displayed on the display device 606. For example, the application 610 may be providing Internet content 612 that is video content, and according to the source device wireless docking profile, the sink device 604 may provide an application 618 for display on the display device 606 that may be a video control application that is provided by the sink device 604 and that is configured to control features of the sink device 604 and/or display device 606 when video is being provided for display such as, for example, to control volume of attached speakers, control a screen capture function, control a zoom feature, control a resize feature, and/or control other features that would be apparent to one of skill in the art in possession of the present disclosure).

In an embodiment, the profiled wireless docking engine 304 in the source device 300/602 operates at block 510 to provide the content information through the display screen subsystem 308 to the source device display screen 602a according to the sink device wireless docking profile. For example, the sink device wireless docking profile may be used by the profiled wireless docking engine 304 in the source device 300/602 to generate a customized graphical user interface on the source device display screen 602a. In a specific example, the source device 602 may wirelessly dock with the sink device 604 and identifies, to the sink device 604, content information that includes the application 610 for display on the display device 606. In this example, the source device 602 may be a tablet computing device, and the sink device information may indicate that the sink device 604 does not include an input device such as a mouse, keyboard, touchpad, or touch input display, and the profiled wireless docking engine 304 may utilize the sink device wireless docking profile to cause the source device 602 to launch an application 616 that compensate for the sink device not including any input devices. For example, the application 616 may include a screen track-pad that is configured to control a mouse icon or other input element that is provided for display on the display device 606, and/or a screen keyboard that is configured to allow the user of the source device 602 to use the tactile/touch screen functionality of the source device display screen 602a of the source device 602 as an input device to provide inputs to content information displayed by the sink device 604 on the display device 606. In embodiments where the source device 602 is not a source device with a touch enabled screen, and/or includes peripheral devices or hardware capabilities such as input devices (e.g., as are typically provided in a laptop computing system), then the source device display screen 602*a* may mirror the display screen 606*a* that is displaying the application 610, or the source device display screen 602*a* may provide an extended desktop screen that is accessible using the source device 602, as described in U.S. patent application Ser. No. 15/266,376, filed on Sep. 15, 2016. While specific examples of providing content information on the sink device 604 and the source device 602 based on wireless docking profiles have been discussed, one of skill in the art in possession of the present disclosure will recognize other configurations of displayed content information via a sink device and on a source device based on information of the components available in the profiled wireless docking system 600 will fall within the scope of the present disclosure as well.

In another embodiment, the source device wireless docking profile may also be used to determine communication path(s) between the source device 602 and the sink device 604 that may be used to provide content information from the source device 602 to the sink device 604. For example, the sink device 604 may monitor network information included in the source device information and/or provided by the networking device 206, and the sink device 604 may use that network information to determine optimal communication path(s) based on different network performance parameters. In a specific example, the sink device 604 may determine which communication path(s) have optimal fidelities, latencies, error rates, power requirements, throughputs, bandwidth, and/or other network performance parameters that would be apparent to one of skill in the art in possession of the present disclosure. In some embodiments, the source device wireless docking profile may prioritize particular network performance parameters relative to each other, and the profiled wireless docking engine 404 may reference the source device wireless docking profile to determine which network performance parameter has the highest priority in determining how to select communication path(s) based on the network information.

In another example, a network performance parameter may include power consumption that is based on the source device type of the source device 602 (e.g., a mobile phone may generate a source device wireless docking profile that prioritizes power efficiency) and that is provided the highest priority relative to other network performance parameters. In such an example, the communication path(s) between the source device 602 and the sink device 604 that requires the least amount of power consumption by the source device 602 may be selected (e.g., a Bluetooth Low Energy (BLE) communication path may be selected because it consumes less power than a WiFi communication path). In another example, the priority of a network performance parameter may be based on content information such as, for example, an application that is being provided to the sink device 604 by the source device 602. In such an example, the source device wireless docking profile may prioritize low latency when the content information includes a gaming application, and when the source device 602 is providing a gaming application to the sink device 604, the communication path(s) available in the wireless docking session that have the lowest latency may be selected. In yet another example, the source device wireless docking profile may prioritize fidelity when the content information includes media content, and when the source device 602 provides content information that includes a video, a communication path(s) with the greatest fidelity may be selected.

In an embodiment, the sink device 604 may identify the communication path(s) on which the source device 602 should provide the content information to the sink device 604. Furthermore, each communication path may include one or more communication channels upon which the content information or subsets of the content information may be provided to the sink device 604 as a single stream. In a specific example, the selection of one or more communication paths that include communication channels upon which the content information may be provided as layered content may be performed according to the teachings of U.S. patent application Ser. No. 15/244,895, filed on Aug. 23, 2016, the disclosure of which is incorporated by reference in its entirety.

Referring to FIGS. 7A and 7B, a specific example of determining a communication path is illustrated. In FIG. 7A, the source device 602 may provide content information that includes the application 610 to the sink device 604 for display on the display device 606. The sink device 604 may then determine that the communication path(s) 700 through the networking device 206 are the most optimal communication path(s) available based on the source device wireless docking profile. The user may then close the application 610 on the source device 602 and launch the application 614 that is to be provided to the sink device 604 for display on the display device 606, as illustrated at FIG. 7B, and the sink device 604 may subsequently determine that the direct communication path(s) 702 between the source device 602 and the sink device 604 (e.g., via a P2P wireless protocol such as BLUETOOTH®) provide the optimal communication path(s) according to the source device wireless docking profile. The sink device 604 may then instruct the source device 602 to provide the application 614 through the direct communication path(s) 702. While specific examples of providing content information over multiple communication paths between the sink device 604 and the source device 602 based on a source device wireless docking profile and/or sink device wireless docking profile are discussed above, one of skill in the art in possession of the present disclosure will recognize other techniques for determining communication path(s) for content information provided between a sink device and a source device based on information associated with the components of the profiled wireless docking system will fall within the scope of the present disclosure as well.

Thus, systems and methods have been described that provide for the generation and use of wireless docking profiles that identify how content information from at least one source device is to be displayed by a sink device on a connected display device, as well as how the content information is to be communicated between the source device and the sink device, and how applications and or other functionality may be provided on the source device to supplement interaction with the sink device based on limitations of the source device and/or the sink device. One of skill in the art in possession of the present disclosure will recognize that the wireless docking profile may generate a unique user experience for a user of the source device when that source device wirelessly docks with the sink device, as well as generate an optimal user experience in situations where the source device and sink device are not already configured to operate together based on the functionality and limitations of each other.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A profiled wireless docking system, comprising:
a source device that includes a source device screen;
a display device; and
a sink device that is coupled to the display device and that is configured to:
  establish a wireless docking session with the source device;
  retrieve, from the source device, source device information about the source device;
  retrieve, from the source device, content information that is provided for display on the source device screen by the source device;
  generate a source device wireless docking profile based on the source device information and the content information;
  provide the content information for display on the display device according to the source device wireless docking profile; and
  transmit, to the source device, sink device information about the sink device, and wherein the source device is configured to:
    generate a sink device wireless docking profile based on the sink device information and the content information;
    generate a graphical user interface based on the sink device wireless docking profile; and
    provide the graphical user interface for display on the source device screen.

2. The system of claim 1, further comprising:
a networking device coupled to a network, the source device, and the sink device, wherein the sink device is configured to:
  retrieve networking device information about the networking device, wherein the source device wireless docking profile is based on the source device information, the content information, and the networking device information.

3. The system of claim 1, wherein the establishing the wireless docking session with the source device includes establishing a first communication path with the source device and establishing a second communication path with the source device, and wherein the sink device is configured to:
  monitor the content information that is provided for display on the source device screen by the source device;
  determine that the source device wireless docking profile indicates that the content information should be provided on the first communication path between the source device and the sink device; and
  provide the content information through the first communication path.

4. The system of claim 3, wherein the sink device is configured to:
  monitor the content information that is provided for display on the source device screen by the source device;
  determine that the source device wireless docking profile indicates that at least a subset of the content information should be provided on the second communication path between the source device and sink device: and
  provide the at least the subset of the content information through the second communication path.

5. The system of claim 4, further comprising:
a networking device coupled to a network, the source device, and the sink device, wherein the first communication path between the source device and the sink device is provided through the networking device, and wherein the second communication path is provided through a peer-to-peer connection between the source device and sink device.

6. The system of claim 1, further comprising:
one or more peripheral devices coupled to the sink device, wherein the sink device is configured to:
  retrieve, from the one or more peripheral devices, peripheral device information about the one or more peripheral devices, wherein the source device wireless docking profile is based on the source device information, the content information, and the peripheral device information.

7. The system of claim 1, wherein the generating the graphical user interface based on the sink device wireless docking profile includes the source device launching an application that is based on the sink device wireless docking profile.

8. An information handling system (IHS), comprising:
a communication subsystem that is configured to provide communication with source devices;
a processing system that is coupled to the communication subsystem; and
a memory system that is coupled to the processing system and that includes instructions that, when executed by the processing system, cause the processing system to provide a profiled wireless docking engine that is configured to:
  establish, via the communication subsystem; a wireless docking session with a source device that includes a source device screen;
  retrieve, from the source device, source device information about the source device;
  retrieve, from the source device, content information that is provided for display on the source device screen by the source device;
  generate a source device wireless docking profile based on the source device information and the content information;
  provide the content information for display on a display device according to the source device wireless docking profile; and
  transmit, to the source device, IHS information about the IHS, and wherein the IHS information is configured to cause the source device to:
    generate a IHS wireless docking profile based on the IHS information and the content information;
    generate a graphical user interface based on the IHS wireless docking profile; and
    provide the graphical user interface for display on the source device screen.

9. The IHS of claim 8, wherein the profiled wireless docking engine is configured to:
  retrieve networking device information about a networking device coupled to a network, the source device, and the communication subsystem, wherein the source device wireless docking profile is based on the source device information, the content information, and the networking device information.

10. The IHS of claim 8, wherein the establishing the wireless docking session with the source device includes establishing a first communication path with the source device and establishing a second communication path with the source device, and wherein the profiled wireless docking engine is configured to:
  monitor the content information that is provided for display on the source device screen by the source device;
  determine that the source device wireless docking profile indicates that the content information should be provided on the first communication path between the source device and the communication subsystem; and
  provide the content information through the first communication path.

11. The IHS of claim 10, wherein the profiled wireless docking engine is configured to:
  monitor the content information that is provided for display on the source device screen by the source device;
  determine that the source device wireless docking profile indicates that at least a subset of the content information should be provided on the second communication path between the source device and sink device; and
  provide the at least the subset of the content information through the second communication path.

12. The IHS of claim 11, wherein the profiled wireless docking engine is configured to:
  provide, by the communication subsystem, the first communication path between the source device and the communication subsystem through a networking device; and
  provide, by the communication subsystem, the second communication path through a peer-to-peer connection between the source device and the communication subsystem.

13. The IHS of claim 8, wherein the profiled wireless docking engine is configured to:
  retrieve, from one or more peripheral devices, peripheral device information about the one or more peripheral devices, wherein the source device wireless docking profile is based on the source device information, and the content information, and the peripheral device information.

14. The IHS of claim 8, wherein the generating the graphical user interface based on the sink device wireless docking profile by the source device includes the source device launching an application that is based on the sink device wireless docking profile.

15. A method for providing profiled wireless docking, comprising:
  establishing, by a sink device, a wireless docking session with a source device that includes a source device screen;
  retrieving, by the sink device from the source device, source device information about the source device;
  retrieving, by the sink device from the source device, content information that is provided for display on the source device screen by the source device;
  generate, by the sink device, a source device wireless docking profile based on the source device information and the content information;
  providing, by the sink device, the content information for display on the display device according to the source device wireless docking profile; and
  transmitting, by the sink device to the source device, sink device information about the sink device, wherein the sink device information about the sink device is configured to cause the source device to:
    generate a sink device wireless docking profile based on the sink device information and the content information;
    generate a graphical user interface based on the sink device wireless docking profile; and
    provide the graphical user interface for display on the source device screen.

16. The method of claim 15, further comprising:
  retrieving, by the sink device, networking device information about a networking device coupled to a network, the source device, and the communication subsystem, wherein the source device wireless docking profile is based on the source device information, the content information, and the networking device information.

17. The method of claim 5, wherein the establishing the wireless docking session includes:
  establishing, by the sink device, a first communication path with the source device;
  establishing, by the sink device, a second communication path with the source device;
  monitoring, by the sink device, the content information that is provided for display on the source device screen by the source device;
  determining, by the sink device, that the source device wireless docking profile indicates that the content information should be provided on the first communication path between the source device and the sink device; and
  providing, by the sink device, the content information through the first communication path.

18. The method of claim 17, wherein the establishing the wireless docking session includes:
  monitoring, by the sink device, the content information that is provided for display on the source device screen by the source device;
  determining, by the sink device, that the source device wireless docking profile indicates that at least a subset of the content information should be provided on the second communication path between the source device and sink device; and
  providing, by the sink device, the at least the subset of the content information through the second communication path.

19. The method of claim 18, wherein the establishing the initial wireless docking session includes:
  providing, by the sink device, the first communication path between the source device and the sink device through a networking device; and
  providing, by the sink device, the second communication path through a peer-to-peer connection between the source device and the sink device.

20. The method of claim 15, wherein the generating, by the source device, the graphical user interface based on the sink device wireless docking profile includes the source device launching an application that is based on the sink device wireless docking profile.

* * * * *